(12) United States Patent
Sun (10) Patent No.: US 7,526,087 B2
(45) Date of Patent: Apr. 28, 2009

(54) RANDOM NUMBER GENERATOR

(75) Inventor: Inng-Lane Sun, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 1112 days.

(21) Appl. No.: 10/340,600

(22) Filed: Jan. 13, 2003

(65) Prior Publication Data

US 2003/0185392 A1 Oct. 2, 2003

(30) Foreign Application Priority Data

Mar. 26, 2002 (TW) ............................. 91105944 A (51) Int. Cl.
*H04L 9/26* (2006.01)
*H04L 9/20* (2006.01)
*H04L 9/22* (2006.01)
*H04L 9/18* (2006.01)
*H04L 9/00* (2006.01)

(52) U.S. Cl. ............................. 380/46; 380/44; 380/47; 380/277; 331/54; 331/78; 331/46; 708/250; 708/251; 708/253; 708/255; 327/164

(58) Field of Classification Search ................ None
See application file for complete search history.

(56) References Cited

U.S. PATENT DOCUMENTS

| | | | |
|---|---|---|---|
| 4,694,412 A | | 9/1987 | Domenik et al. |
| 5,675,649 A | * | 10/1997 | Brennan et al. ............. 380/286 |
| 6,061,702 A | * | 5/2000 | Hoffman ..................... 708/251 |
| 6,566,858 B1 | * | 5/2003 | Silverbrook et al. ...... 324/158.1 |
| 7,007,060 B2 | * | 2/2006 | Miller, Jr. ................... 708/801 |
| 7,117,233 B2 | * | 10/2006 | Dichtl ......................... 708/250 |
| 7,193,481 B2 | * | 3/2007 | Luzzi .......................... 331/78 |
| 2005/0027765 A1 | * | 2/2005 | Wells .......................... 708/250 |
| 2006/0218212 A1 | * | 9/2006 | Mattison ..................... 708/251 |
| 2008/0258825 A1 | * | 10/2008 | Gressel et al. ................ 331/78 |

OTHER PUBLICATIONS http://ieeexplore.ieee.org/iel5/40/21083/00977755.pdf?tp=&arnumber=977755&isnumber=21083.*
Petrie et al., "A Noise-Based IC Random Number Generator for Applications in Cryptography," IEEE Transactions on Circuits and Systems- I: Fundamental Theory and Applications, vol. 47, No. 5 May 2000, pp. 615-621.

* cited by examiner

*Primary Examiner*—Syed A. Zia
(74) *Attorney, Agent, or Firm*—Birch, Stewart, Kolasch & Birch, LLP (57) ABSTRACT

A random number generator. The random number generator includes a noise source, a circuit controlling random current consumption, and a circuit generating random bits. A noise voltage output from the noise source drives the circuit controlling random current consumption, which also generates a random control signal. The circuit generating random bits also includes a voltage-controlled oscillator, a plurality of frequency dividers, and a plurality of flip-flops. The voltage-controlled oscillator is controlled by both the noise voltage and the random control signal. The output of the voltage-controlled oscillator is input to the frequency dividers and the flip-flops to generate a random number.

18 Claims, 6 Drawing Sheets

RANDOM NUMBER GENERATOR

BACKGROUND OF THE INVENTION

1. Field of the Invention

The invention relates to a random number generator, and more particularly to a random number generator which combines several random number generating techniques to generate more thoroughly random numbers.

2. Description of the Related Art

At present, popular smart cards i.e. integrated circuit cards, store a wealth of information. Unfortunately, this valuable information can be misappropriated by various ways of invasion.

In smart card operation, different commands may generate different specific power profiles. With respect to power supply, one power profile corresponds to a specific voltage-current profile. These unique voltage and current profiles are generally regarded as noise, but can prove useful in the misappropriation of data. For example, one current consumption spectrum corresponds to one running command.

Simple power analysis (SPA) and differential power analysis (DPA) use current analysis to identify different commands. SPA directly observes different results for different commands running in the cryptographic process according to the cryptography to develop power consumption models and time. DPA uses statistical methodology and error recovery techniques to develop power consumption change model.

To preventing valuable information from being stolen, an additional power consumption circuit is added to a chip. The chip requires extra power on the power consumption circuit when different commands are running. Using the power consumption circuit can change the characteristics of the current spectrum.

Although the power consumption circuit can change the characteristics of the current spectrum, if power consumption circuit regularly operates the commands can still be identified by the statistics and analysis. To overcome this disadvantage, a random number generator is added to drive the power consumption circuit.

Figure 1:
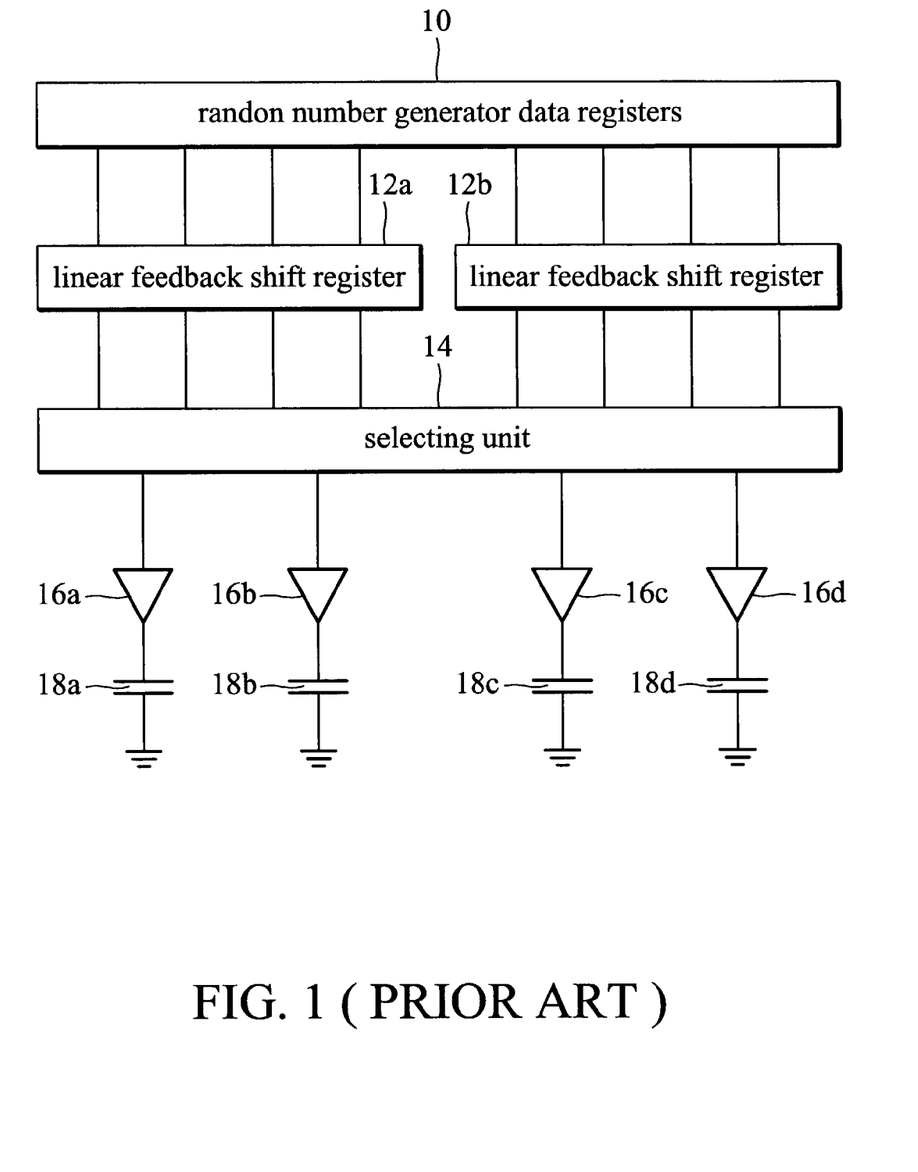
FIG. 1 is a schematic illustrating a conventional random power consumption circuit.

FIG. 1 is a schematic illustrating a conventional random power consumption circuit. Random numbers generated from the random number generator are stored in a data register 10. By a linear feedback shift register 12a and 12b, random numbers select and drive a power consumption circuit which comprises inverters 16a~16d and capacitors 18a~18d. A selecting unit 14 uses the data stored in the data registers 10 to drive the power consumption circuit through the linear feedback shift register 12a and 12b. Although extra power can change the characteristics of the current spectrum, the extra power is a disadvantage for smart cards requiring low power operation.

As well, only limited random numbers can be generated by the linear feedback shift register because the number pattern will be repeated periodically. The repeated period is related to the bit number of the linear feedback shift register (n). Different algorithms applied to arrange registers can generate different patterns, and the maximum period is $2^n$.

In cryptographic devices, a larger value of N is preferred, but unrepeated random numbers are necessary for chips operating for a long time, to secure stored information.

The random number generator requires not only resolving the problem of the finite length of the random number but also generating more thoroughly random bits.

Use of a slow oscillator and fast oscillator to generate random numbers is disclosed in U.S. Pat. No. 4,694,412. The cited circuit is simply and easy design and use but produces less uniformly distributed random numbers.

To increased randomness combining resistor-based noise and a voltage-controlled slow oscillator is disclosed in U.S. Pat. No. 6,061,702.

In conclusion, it is necessary to provide a security system including a random number generator with current analysis tampering resistance and enough length for truly random patterns on a single chip.

SUMMARY OF THE INVENTION

An object of the present invention is to provide a random number generator which comprises a circuit controlling random current consumption and a circuit generating random bits. The analog circuit controlling random current consumption is combined into the random number generator to simplify the design and decrease power consumption. Therefore, the random number generator can be implemented within a cryptographic device and has current analysis tampering resistance.

Another object of the present invention is to provide a random number generator which combines several random number generating techniques to generate more thoroughly but uniformly distributed random numbers.

Accordingly, the present invention provides a random number generator, comprising a noise source, a circuit controlling random current consumption and a circuit generating random bits. A noise voltage output from the noise source drives the circuit controlling random current consumption. The circuit controlling random current consumption also generates a random control signal. The circuit generating random bits receives the noise voltage from the noise source and the random control signal from the circuit controlling random current consumption to generate a random number. The circuit generating random bits comprises a voltage-controlled oscillator controlled by both the noise voltage and the random control signal.

The circuit controlling random current consumption further comprises a comparator, a shift register, and a decoder. The comparator receives the noise voltage to generate a digital signal. The shift register receives and stores the digital signal. The decoder receives the digital signal stored in the shift register and decodes the digital signal to generate the random control signal.

The circuit generating random bits further comprises a plurality of frequency dividers and a plurality of flip-flops. The frequency dividers are coupled to the voltage-controlled oscillator. The flip-flops are coupled to the frequency dividers to generate the random number.

The voltage-controlled oscillator further comprises at least three inverting oscillators, a plurality of buffers for charging and discharging and at least three capacitors. The inverting oscillators receive the noise voltage and generate a clock output. The buffers for charging and discharging are uniformly coupled to the inverting oscillator. The buffers for charging and discharging receive the random control signal from the circuit controlling random current consumption. The random control signal controls the number of buffers for charge and the number of buffers for discharge. Each capacitor is coupled to one of the inverting oscillators in parallel. The clock is controlled by the number of buffers for charge and the number of buffers for discharge due to the capacitors.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4b is a diagram showing a data result from the random number generator on the condition shown in FIG. 4a;

DETAILED DESCRIPTION OF THE INVENTION

Petrie and Connelly (see C. S. Petrie and J. A. Connelly, "A Noise-based IC Random Number Generator for Application in Cryptography," IEEE Trans. Circuit Syst., vol. 47, no. 5, May 2000, pp. 615-621) disclose a method to combine several random number generating techniques to generate more thoroughly random numbers. The structure of the design combines the oscillator-based random number generator, the resistor-based random number generator, and the chaos random number generator.

The random number generator of the present invention also combines several random number generating techniques to generate more thoroughly random numbers. However, the voltage-controlled oscillator of the present invention is controlled by both a noise voltage from the noise source and a random control signal from a circuit controlling random current consumption. As well, the random number generator of the present invention comprises an oscillator-based random number generator and a circuit controlling random current consumption to solve the problem of power consumption, and to generate more thoroughly random numbers at the same time.

Figure 2:
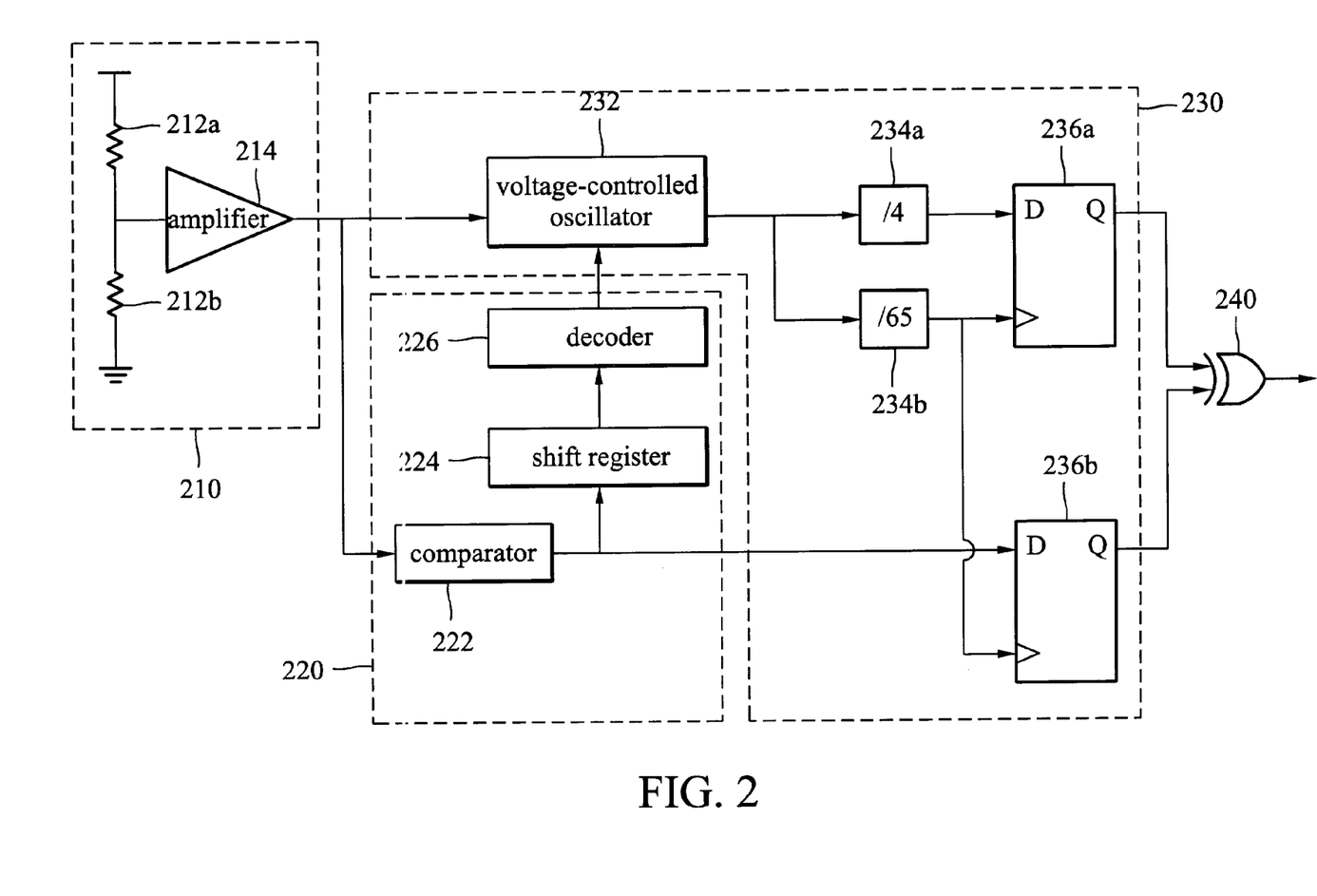
FIG. 2 is a block diagram illustrating a random number generator according to the embodiment of the invention.

FIG. 2 is a block diagram illustrating a random number generator according to the embodiment of the invention. The random number generator comprises a noise source 210, a circuit controlling random current consumption 220 and a circuit generating random bits 230. The noise source 210 comprises resistors 212a and 212b, and an amplifier 214 to generate a noise signal. The circuit generating random bits 230 comprises a voltage-controlled oscillator 232, frequency dividers 234a and 234b, and flip-flops 236a and 236b. The frequency output from the voltage-controlled oscillator 232 is divided into 4 and 65 in the frequency dividers 234a and 234b respectively. The output of the frequency dividers 234a and 234b are selected by the flip-flops 236a and 236b. The outputs of the flip-flops 236a and 236b are input into a XOR gate 240 to generate a random number output. The circuit controlling random current consumption 220 comprises a comparator 222, a shift register 224 and a 32-bit decoder 226. The noise signal from the noise source 210 drives the circuit controlling random current consumption 220 to control the voltage-controlled oscillator 232 of the circuit generating random bits 230.

The noise source 210 comprises the resistors 212a and 212b, and the amplifier 214. When a current flows through the resistors 212a and 212b, it generates thermal noise voltage $E_t$. In statistics, the thermal noise is stochastic i.e. it cannot be represented in a formula despite past records, making it impossible to infer a newer example. The unexpected characteristic is important for applications which require security, such as cryptographic device, communication or security service requirement, etc.

The thermal noise voltage $E_t$ is related to a temperature, a function of the resistor value and a bandwidth of the thermal noise.

$$E_t = \sqrt{4k \times T \times R_s \times \Delta f}$$

Wherein T is the temperature, $R_s$ is the value of the resistor and $\Delta f$ is the bandwidth of the thermal noise.

The bandwidth of the thermal noise $\Delta f$ is related to a first order low pass filter formed by the equivalent input capacitor $C_{in}$ of the amplifier 214 and the resistor $R_s$. Thus, if the thermal noise generated by the resistors 212a and 212b is directly amplified to become a noise source, the bandwidth will be limited. If the −3 dB bandwidth of the amplifier is much higher than the bandwidth of the thermal noise, an equivalent voltage of the thermal noise voltage at the input terminal of the amplifier $E_{ni}$ is $$E_{ni} = \sqrt{k \times T / C_{in}}$$

The circuit generating random bits 230 comprises the voltage-controlled oscillator 232, the frequency dividers 234a and 234b, and the flip-flops 236a and 236b. The above resistor-based noise source is a very common source for generating random numbers in integrated circuits. Directly amplifying the thermal noise generated by the resistors 212a and 212b generates a truly random number (distinguished from a pseudo random number). However, the application of the resistor-based noise source is limited to the influence of the bandwidth, the 1/f noise, the temperature or the pseudo noise, such as the power supply noise.

Another technique to generate random numbers is to use oscillator. During the process of the oscillator generating clocks, it is influenced by thermal noise and generating phase and frequency jitter. When phases and frequencies of clocks are not constant values, the flip-flops can generate random numbers by using high frequency and low frequency clocks.

In theory, using the phase noise can generate more thoroughly random numbers. In practice, however, it may have limited usage owing to the entropy rate in the real oscillator circuit, i.e., in the structure of the present circuit, the entropy rate of the oscillator is not enough to generate more thoroughly random numbers.

To overcome the limited entropy-rate problem, a noise source is added into the oscillator circuit to increase the entropy rate of the oscillator and generate more thoroughly random numbers.

Combining the oscillator-based random number generating technique and the resistor-based random number generating technique, in the embodiment of the present invention, the noise voltage generated from the noise source 210 (resistor-based noise) is input to the voltage-controlled oscillator 232 to increase the entropy rate of the voltage-controlled oscillator 232. Thus, the frequency output from the voltage-controlled oscillator 232 has high enough phase noise to generate truly random bits.

As well, Petrie and Connelly (see C. S. Petrie and J. A. Connelly, "Modeling and Simulation of Oscillator-based Random Number Generators," in Proc. ISCAS' 96, vol. 4, May 1996, pp. 324-327) disclose, in an oscillator-based random number generator, when the ratio of high frequency to the low frequency of the input clock is increasing and is not an integer, the random number has more thorough random distribution. Therefore, the frequency output from the voltage-controlled oscillator 232 is divided into 4 and 65 in the frequency dividers 234a and 234b respectively. The ratio of the high frequency of the input clock to the low frequency of the input clock is 16.25:1. In this ratio, the output of the frequency dividers 234a and 234b are selected by the flip-flops 236a and 236b to generate random numbers with more thorough randomness.

An additional power consumption circuit can protect current information when the chip operates. The extra power consumption is a disadvantage for portable devices which require low power consumption. To overcome the disadvantage, capacitors for power consumption are integrated into the voltage-controlled oscillator in the embodiment of the present invention. The power consumption circuit becomes a part of a circuit for modulating the output phase and the output frequency in the voltage-controlled oscillator.

To combine the oscillator-based random number generating technique and the chaos random number generating technique, in the embodiment of the present invention, the circuit controlling random current consumption 220 comprises the comparator 222, the shift register 224 and the 32-bit decoder 226. Through the comparator 222, the noise voltage generated from the noise source 210 becomes digital signals such as "1" or "0". The digital signals are stored into the shift register 224. The values of the shift register 224 resemble random numbers generated from a chaos random number generator. The random numbers are decoded in the 32-bit decoder 226. The decoded numbers control the number of inverted tri-state buffers for charge and the number of the inverted tri-state buffers for discharge to control current consumption (see the illustration in FIG. 3).

Figure 3:
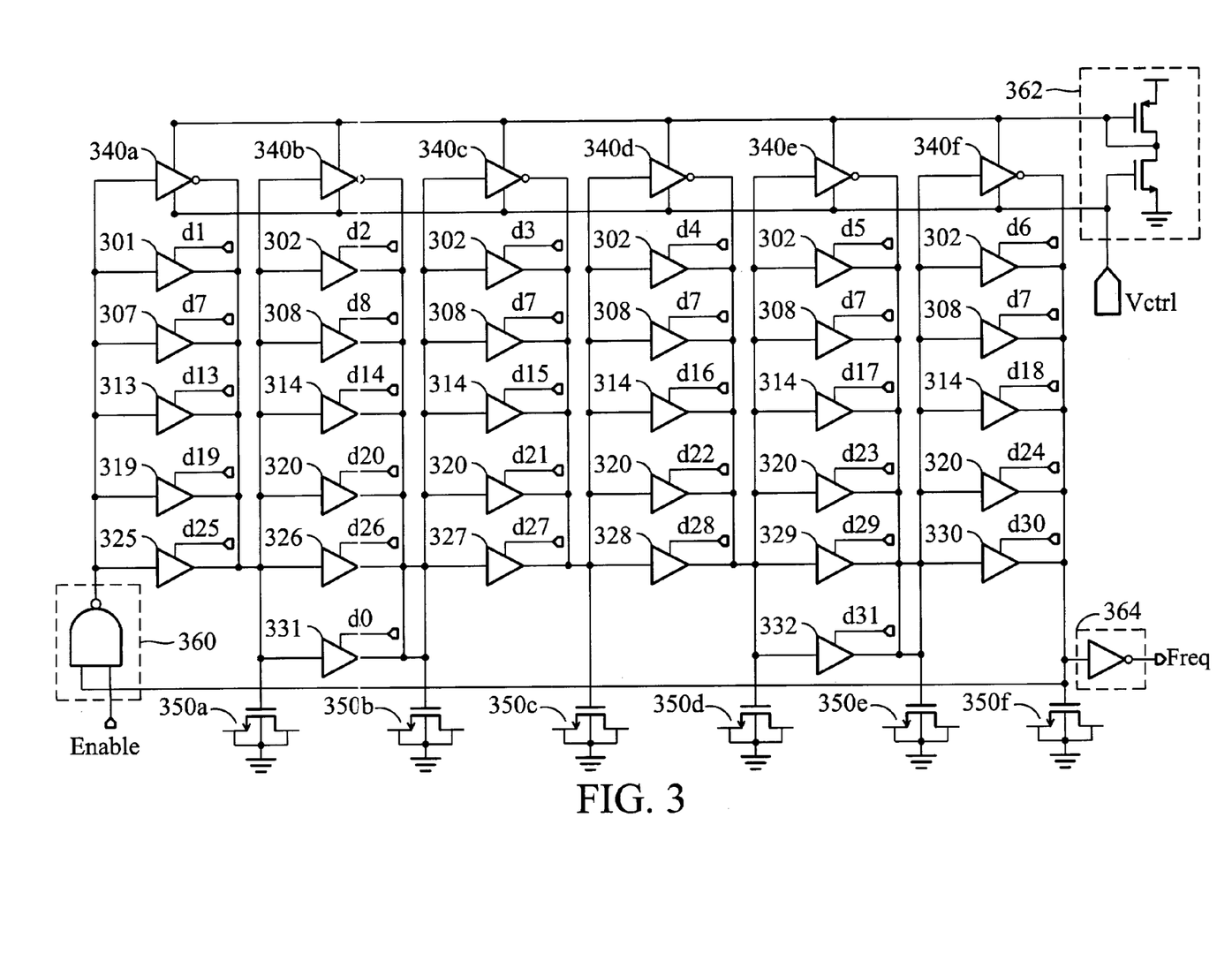
FIG. 3 is a circuit diagram illustrating one embodiment of the voltage-controlled oscillator shown in FIG. 2.

FIG. 3 is a circuit diagram illustrating one embodiment of the voltage-controlled oscillator shown in FIG. 2. The voltage-controlled oscillator 232 comprises six inverting oscillators 340a~340f, thirty two tri-state buffers 301~332, six NMOS capacitors 350a~350f, a switch controlling circuit 360, a noise controlled circuit 362 and a clock output circuit 364.

Through the switch controlling circuit 360, a switch controlling signal (Enable) controls the switch status of the voltage-controlled oscillator 232. Through the noise controlled circuit 362, the NMOS capacitors 350a~350f receives the noise voltage (Vctrl) from the noise source (shown in FIG. 2) and outputs a clock (Freq) from the clock output circuit 364. The number of tri-state buffers is determined by the bits of the decoder (shown in FIG. 2).

The tri-state buffers 301~332 are uniformly coupled to the inverting oscillators 340a~340f and receive random control signals d0~d31 from the circuit controlling random current consumption 220 (shown in FIG. 2). The random control signals d0~d31 control the number of tri-state buffers 301~332 for charge and the number of tri-state buffers 301~332 for discharge. Each of NMOS capacitors 350a~350f is coupled to one of inverting oscillators 340a~340f in parallel. Through NMOS capacitors 350a~350f, the clock output frequency from the inverting oscillators 340a~340f is controlled by the number of tri-state buffers 301~332 for charge and the number of tri-state buffers 301~332 for discharge.

Through the noise controlled circuit 362, the voltage-controlled oscillator 232 receives the noise voltage (Vctrl) to generate different frequencies. The chaos-like random number generator 220 controls the number of tri-state buffers 301~332 for charging and discharging by the random control signals d0~d31 to determine output gain factors gm between the inverting oscillators 340a~340f. Because the NMOS capacitors 350a~350f parallel connected to the inverting oscillators 340a~340f are the same, the time delay ($\tau_{inv} \sim C_L/g_m$) is influenced by the number of tri-state buffers 301~332 for charge and the number of tri-state buffers 301~332 for discharge. Thus, the frequency and phase of the clock output from the voltage-controlled oscillator 232 are both controlled by the noise voltage, and the numbers of tri-state buffers 301~332 for charge and for discharge.

Figure 4A:
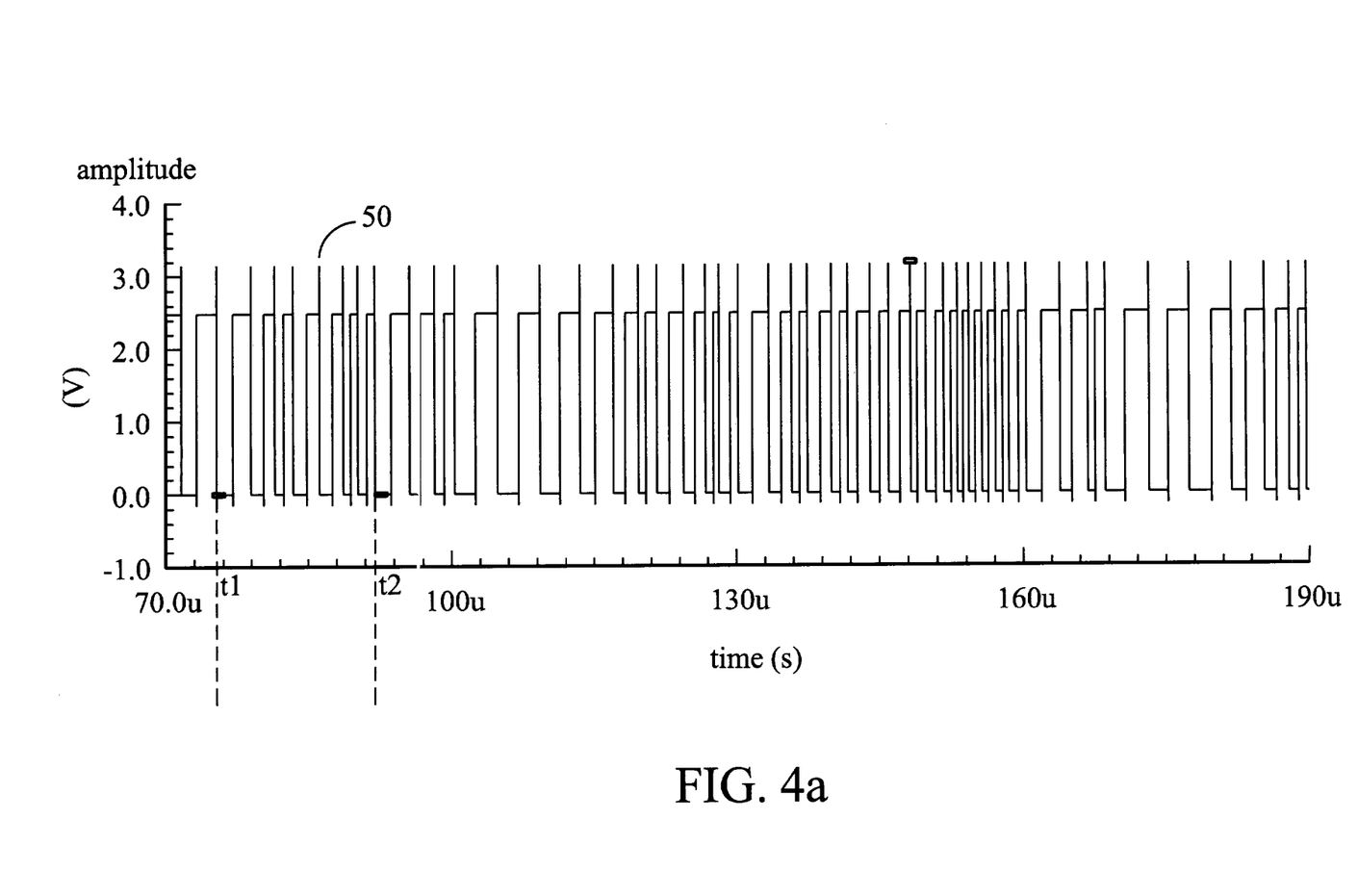
FIG. 4a is a diagram showing the clock output from the voltage-controlled oscillator of the random number generator according to the embodiment of the invention.
Figure 4B:
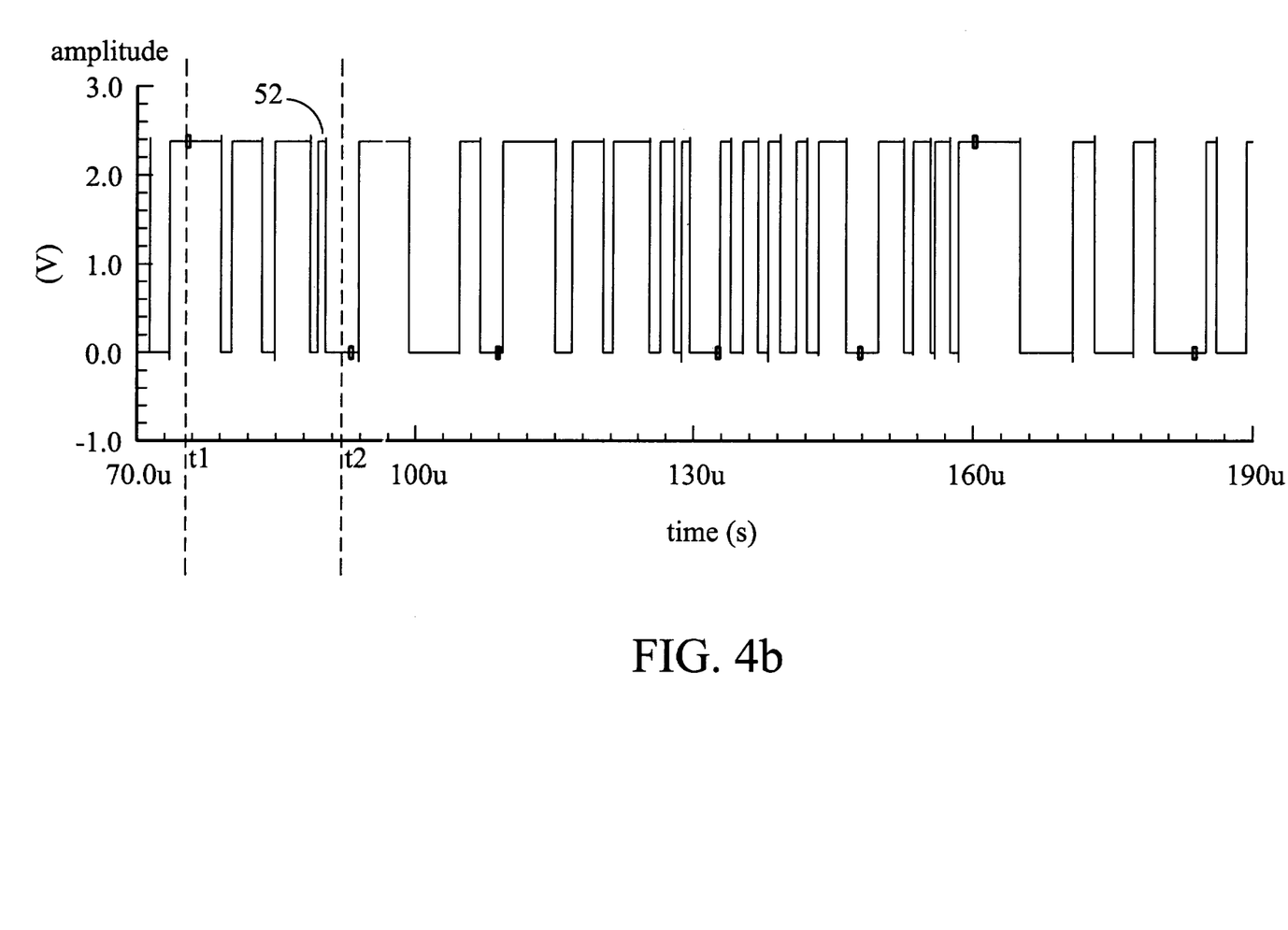

FIG. 4a is a diagram showing the clock output from the voltage-controlled oscillator of the random number generator according to the embodiment of the invention. FIG. 4b is a diagram showing a data result from the random number generator on the condition shown in FIG. 4a. The cross axis is time. The unit of time is seconds (s). The vertical axis is amplitude. The unit of amplitude is voltage (v). As shown in FIG. 4a, signal 50 shows the clock result from the voltage-controlled oscillator of the random number generator. As shown in FIG. 4b, signal 52 shows the data i.e. random number output from the random number generator. When the signal 50 changes from "1" (high voltage) to "0" (low voltage), one random bit comes out. For example, when the signal 50 changes from "1" to "0" at the time t1, the random number output from the random number generator 52 is "1" at the time t1. When the signal 50 changes from "0" to "1" at the time t2, the random number output from the random number generator 52 is "0" at the time t2. The frequency and the phase of the clock output from the voltage-controlled oscillator 50 are variable, showing the voltage-controlled oscillator influenced by the resistor-base noise and the chaos noise. As well, the period the random number 52 is also variable and unpredictable.

Figure 5:
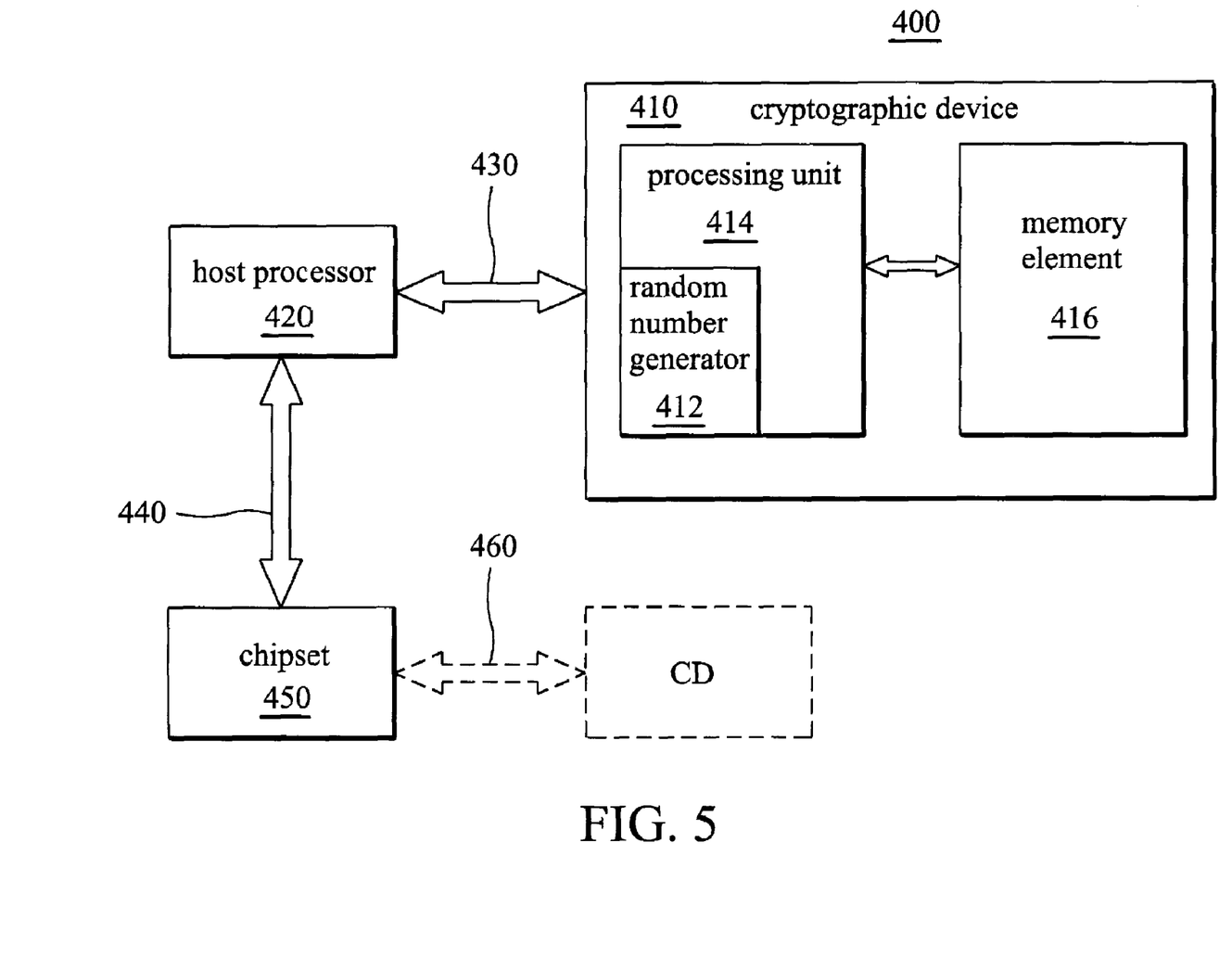
FIG. 5 is a block diagram of one embodiment of a system implemented with a cryptographic device featuring the present invention.

FIG. 5 is a block diagram of one embodiment of a system implemented with a cryptographic device featuring the present invention. As shown in FIG. 5, the random number generator 412 of the present invention may be implemented within a cryptographic device 410. The cryptographic device 410 includes at least a processing unit 414, typically integrated with random number generator 412, and a memory element 416 in communication with processing unit 414. In this embodiment, the memory element 416 is non-volatile memory (e.g., flash memory) contained in the same package containing processing unit 414.

As shown, within an electronic system 400 (e.g., a computer, or peripheral equipment such as a facsimile machine or scanner, etc.), cryptographic device 410 may be interconnected to a host processor 420 via a dedicated bus 430 (as shown).

However, as an alternative embodiment, the cryptographic device 410 may be connected to a chipset 450 via another dedicated bus 460 represented by dotted lines. Then, via a host bus 440, the cryptographic device 410 may be connected to the host processor 420.

The advantage of the present invention is provision of a random number generator which combines several random number generating techniques to generate more thoroughly random numbers. As well, the random number generator of the present invention comprises an oscillator-based random number generator and a circuit controlling random current consumption to solve the problems of power consumption and chip security.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A random number generator, comprising:
   a noise source;
   a circuit controlling random current consumption, receiving a noise voltage from the noise source to drive the circuit controlling random current consumption and producing a random control signal, and comprising:
      a comparator for receiving the noise voltage from the noise source to generate a digital signal;
      a shift register for receiving and storing the digital signal; and
      a decoder for receiving the digital signal stored in the shift register and decoding the digital signal to generate the random control signal; and
   a circuit generating random bits, receiving the noise voltage from the noise source and the random control signal from the circuit controlling random current consumption to generate a random number, the circuit generating random bits comprising:
      a voltage-controlled oscillator controlled by both the noise voltage and the random control signal, the voltage-controlled oscillator comprising:
         at least three inverting oscillators for receiving the noise voltage and generating a clock output;
         a plurality of buffers for charging and discharging uniformly coupled to the inverting oscillator, for receiving the random control signal from the circuit controlling random current consumption, the random control signal controlling the number of buffers for charge and the number of buffers for discharge; and
         at least three capacitors, each coupled to one of the inverting oscillators in parallel,
         wherein, through the capacitors, the clock is controlled by the number of buffers for charge and the number of buffers for discharge; and
      a plurality of frequency dividers coupled to the voltage-controlled oscillator; and
      a plurality of flip-flops coupled to the frequency dividers to generate the random number.

2. The random number generator of claim 1, wherein the noise source is a resistor-based random number generating unit.

3. The random number generator of claim 1, wherein the noise source comprises: a plurality of resistors; and an amplifier coupled to the resistors.

4. The random number generator of claim 1, wherein the charge and discharge buffers are inverted tri-state buffers.

5. The random number generator of claim 1, wherein the capacitors are NMOS capacitors.

6. A system comprising:
   a host processor; and
   a cryptographic device in communication with the host processor, the cryptographic device comprising:
      a processing unit; and
      a random number generator integrated on the processing unit, the random number generator comprising:
         a noise source;
         a circuit controlling random current consumption, receiving a noise voltage from the noise source to drive the circuit controlling random current consumption and producing a random control signal, and comprising:
            a comparator for receiving the noise voltage from the noise source to generate a digital signal;
            a shift register for receiving and storing the digital signal; and
            a decoder for receiving the digital signal stored in the shift register and decoding the digital signal to generate the random control signal; and
         a circuit generating random bits, receiving the noise voltage from the noise source and the random control signal from the circuit controlling random current consumption to generate a random number, the circuit generating random bits comprising:
            a voltage-controlled oscillator controlled by both the noise voltage and the random control signal to generate a clock, the voltage-controlled oscillator comprising:
               at least three inverting oscillators for receiving the noise voltage and generating a clock output;
               a plurality of buffers for charging and discharging uniformly coupled to the inverting oscillator, for receiving the random control signal from the circuit controlling random current consumption, the random control signal controlling the number of buffers for charge and the number of buffers for discharge; and
               at least three capacitors, each coupled to one of the inverting oscillators in parallel,
               wherein, through the capacitors, the clock is controlled by the number of buffers for charge and the number of buffers for discharge; and
            a plurality of frequency dividers coupled to the voltage-controlled oscillator; and
            a plurality of flip-flops coupled to the frequency dividers to generate the random number.

7. The system of claim 6, wherein the cryptographic device further comprises a memory element coupled to the processing unit.

8. The system of claim 7, wherein the memory element of the cryptographic device is a separate non-volatile memory.

9. The system of claim 6, wherein the cryptographic device is connected to the host processor through a host bus or a dedicated bus.

10. The system of claim 6 further comprising:
    a chipset connected to the host processor; and
    a bus connected to the chipset and the cryptographic device.

11. The system of claim 6, wherein the noise source is a resistor-based random number generating unit.

12. The system of claim 6, wherein the noise source comprises:
    a plurality of resistors; and
    an amplifier coupled to the resistors.

13. The system of claim 6, wherein the charge and discharge buffers are inverted tri-state buffers.

14. The system of claim 6, wherein the capacitors are NMOS capacitors.

15. The random number generator of claim 1, wherein the voltage-controlled oscillator is controlled by both the noise voltage and the random control signal to generate the random number.

16. The system of claim 6, wherein the voltage-controlled oscillator is controlled by both the noise voltage and the random control signal to generate the random number.

17. The random number generator of claim 1, wherein the noise source is a thermal-based random number generating unit.

18. The system of claim 6, wherein the noise source is a thermal-based random number generating unit.

* * * * *